United States Patent
Druist et al.

(10) Patent No.: US 7,243,411 B2
(45) Date of Patent: Jul. 17, 2007

(54) METHOD FOR PROTECTING WRITE HEAD COIL DURING WRITE POLE/SHAPING

(75) Inventors: David P. Druist, Santa Clara, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 227 days.

(21) Appl. No.: 11/037,405

(22) Filed: Jan. 18, 2005

(65) Prior Publication Data

US 2006/0156537 A1 Jul. 20, 2006

(51) Int. Cl.
*G11B 5/127* (2006.01)
*G11B 5/147* (2006.01)
*C23C 13/00* (2006.01)

(52) U.S. Cl. .............. 29/603.07; 29/603.12; 29/603.23; 29/603.24; 29/603.25; 360/126; 204/192.34

(58) Field of Classification Search ......... 29/603.23, 29/603.24, 603.25, 603.07, 606, 603.12; 360/126, 317, 122, 97.2; 204/192.34, 192.2, 204/192.12, 192.15; 216/22, 66, 68–71; 219/121.68, 121.69, 121.71
See application file for complete search history.

(56) References Cited

U.S. PATENT DOCUMENTS

| | | | |
|---|---|---|---|
| 5,658,470 A * | 8/1997 | Schultz et al. | 216/22 |
| 5,985,104 A | 11/1999 | Westwood | |
| 6,054,023 A | 4/2000 | Chang et al. | |
| 6,118,629 A * | 9/2000 | Huai et al. | 360/126 |
| 6,317,288 B1 * | 11/2001 | Sasaki | 360/126 |
| 6,696,226 B1 * | 2/2004 | Dinan et al. | 430/320 |
| 2002/0181162 A1 | 12/2002 | Chen et al. | |
| 2004/0085674 A1 | 5/2004 | Han et al. | |

* cited by examiner

*Primary Examiner*—A. Dexter Tugbang
*Assistant Examiner*—Tai Van Nguyen
(74) *Attorney, Agent, or Firm*—David W. Lynch; Chambliss, Bahner & Stophel PC

(57) ABSTRACT

A method for protecting a write head coil during write pole notching using ion mill resistant mask formed by reactive ion etching is disclosed. Ion mill shaping of the write pole is performed after depositing an ion mill-resistant material to protect the coil.

21 Claims, 6 Drawing Sheets

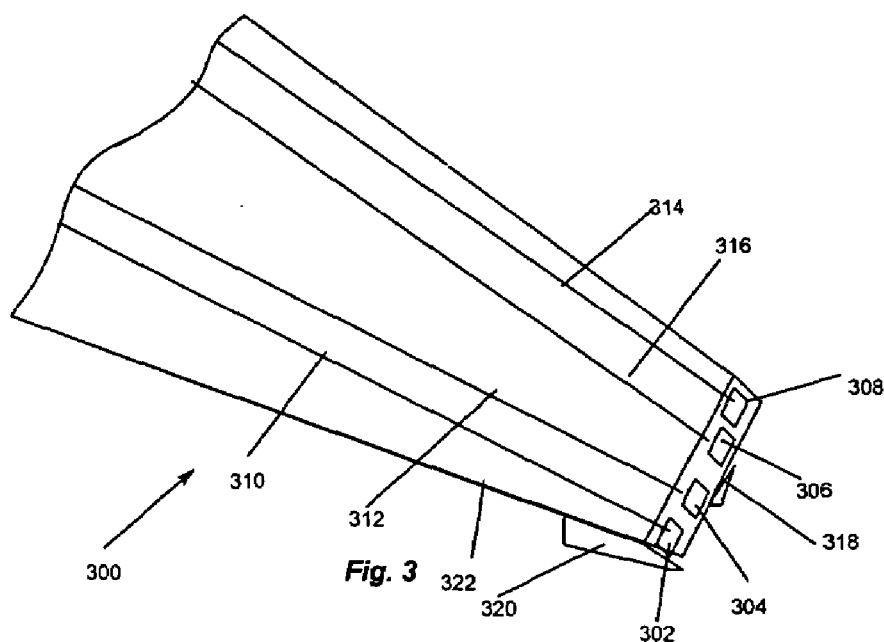
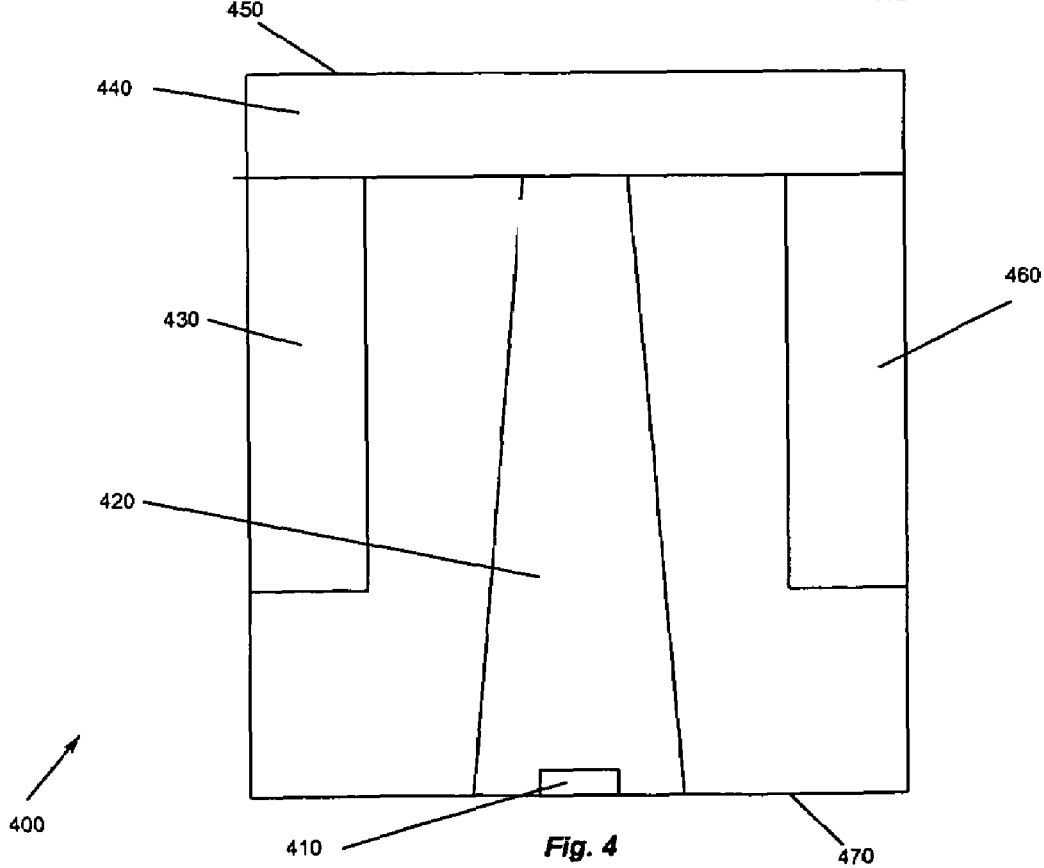

METHOD FOR PROTECTING WRITE HEAD COIL DURING WRITE POLE/SHAPING

BACKGROUND OF THE INVENTION

1. Field of the Invention

This disclosure relates in general to magnetic storage systems, and more particularly to a method for protecting write head coil during write pole notching using ion mill resistant mask formed by reactive ion etching.

2. Description of Related Art

Disk drives are used as primary data storage devices in modern computer systems and networks. A typical disk drive comprises one or more rigid magnetizable storage disks, which are rotated by a spindle motor at a high speed. An array of read/write heads transfer data between tracks of the disks and a host computer. The heads are mounted to an actuator assembly that is positioned so as to place a particular head adjacent the desired track.

Information is written on each disk in a plurality of concentric tracks by a transducer assembly mounted on an actuator arm. Typically, the transducer assembly is suspended over the disk from the actuator arm in a slider assembly, which includes air bearing surfaces designed to interact with a thin layer of moving air generated by the rotation of the disks. Transducer assemblies are said to "fly" over the disk surface as the disk rotates. To access tracks on the disk, the actuator arm moves in an arc across the disk. The physical distance between the nominal centers of two adjacent tracks is referred to as the "track pitch". The track pitch and linear track density define the storage capacity of the disk.

Each of the disks is coated with a magnetizable medium wherein the data is retained as a series of magnetic domains of selected orientation. The data are imparted to the data disk by a write element of the corresponding head. The data thus stored to the disk are subsequently detected by a read element of the head. Although a variety of head constructions have been utilized historically, magneto-resistive (MR) heads are typically used in present generation disk drives. The write element of a magnetic head uses a thin-film inductive coil arranged about a ferromagnetic core having a write gap. As write currents are passed through the coil, a magnetic write field is established emanating magnetic flux lines from the core and fringing across the write gap. The flux lines extend into the magnetizable medium to establish magnetization vectors in selected directions, or polarities, along the track on the data disk. Magnetic flux transitions are established at boundaries between adjacent magnetization vectors of opposite polarities.

To write a computer file to disk, the disk drive receives the file from the host computer in the form of input data that are buffered by an interface circuit. A write channel encodes and serializes the data to generate a data input stream that can be represented as a square-wave type signal of various lengths between rising and falling signal transitions.

A write driver circuit uses the data input stream to generate a write current which is applied to the write head, creating the magnetic write field that writes the encoded data to the magnetizable medium of the selected disk. The write current both reverses the polarity of the magnetic write field, creating the magnetic flux transitions, and sustains a given polarity between successive magnetic flux transitions.

A write head typically employs two ferromagnetic poles capable of carrying flux signals for the purpose of writing the magnetic impressions into the track of a magnetic disk or tape. The poles are fabricated on a slider with the pole tips located at the air bearing surface. Processing circuitry digitally energizes the write coil that induces flux signals into the poles. The flux signals bridge across the write gap at the air bearing surface so as to write the magnetic information into the track of the rotating disk. The thinner the thickness of the write gap layer, the greater the number of bits the write head can write into the track.

A write head is typically rated by its areal density that is a product of its linear bit density and its track width density. The linear bit density is the number of bits that can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer.

In order to improve the recording density in the performances of a recording head, it is necessary to increase track density of a magnetic recording medium. For this purpose, it is necessary to realize a recording head of a narrow track structure in which the width on the air bearing surface of each of a bottom pole and a top pole formed sandwiching a write gap is reduced to the order of a few microns to submicrons. In order to achieve this, semiconductor processing techniques are used.

For example, ion milling is used to trim and shape the magnetic pole in a magnetic write head. However, previous layers of the write head can be damaged during this ion milling. The inductive copper coil is particularly prone to this damage, which can cause an increase in coil resistance and hence heating during writing. Another deleterious effect is that copper redeposition during ion milling can cause high resistance shorts between the coil and the magnetic yoke, especially for write heads with a single layer coil and planar top yoke/pole. These high resistance shorts cause the magnetic write heads to be unusable, and they must be discarded.

To protect the buried coil, a photoresist protection layer is patterned previous to the ion milling steps. However, these resist masks are eroded during the milling, and the area that is protected changes during the ion mill. To prevent damage to the coil during the milling, the first turn of the coil is usually recessed from the ABS. However, to recess the first turn of the coil, the length of the magnetic yoke that the coil sits within must be lengthened, which impacts the performance of the write head at high data rates needed for sever and desktop drives.

It can be seen that there is a need for a method for protecting write head coil during write pole notching using ion mill resistant mask formed by reactive ion etching.

SUMMARY OF THE INVENTION

To overcome the limitations described above, and to overcome other limitations that will become apparent upon reading and understanding the present specification, the present invention discloses a method for protecting write head coil during write pole notching using ion mill resistant mask formed by reactive ion etching.

The present invention solves the above-described problems by performing ion mill shaping of the write pole while an ion mill-resistant mask is in place. The ion mill mask protects the coil during the ion milling.

A method for protecting write head coil during write pole notching in accordance with the principles of an embodiment of the present invention includes plating a magnetic pole, depositing an ion mill-resistant etchable material for protecting a coil structure of a write head, patterning a photoresist mask using photolithography, transferring the pattern into the mask using reactive ion etching and performing ion milling to trim and shape the magnetic pole.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for protecting write head coil during write pole notching using ion mill resistant mask formed by reactive ion etching. Ion mill shaping of the write pole is performed after depositing an ion mill-resistant material to protect the coil.

Figure 1:
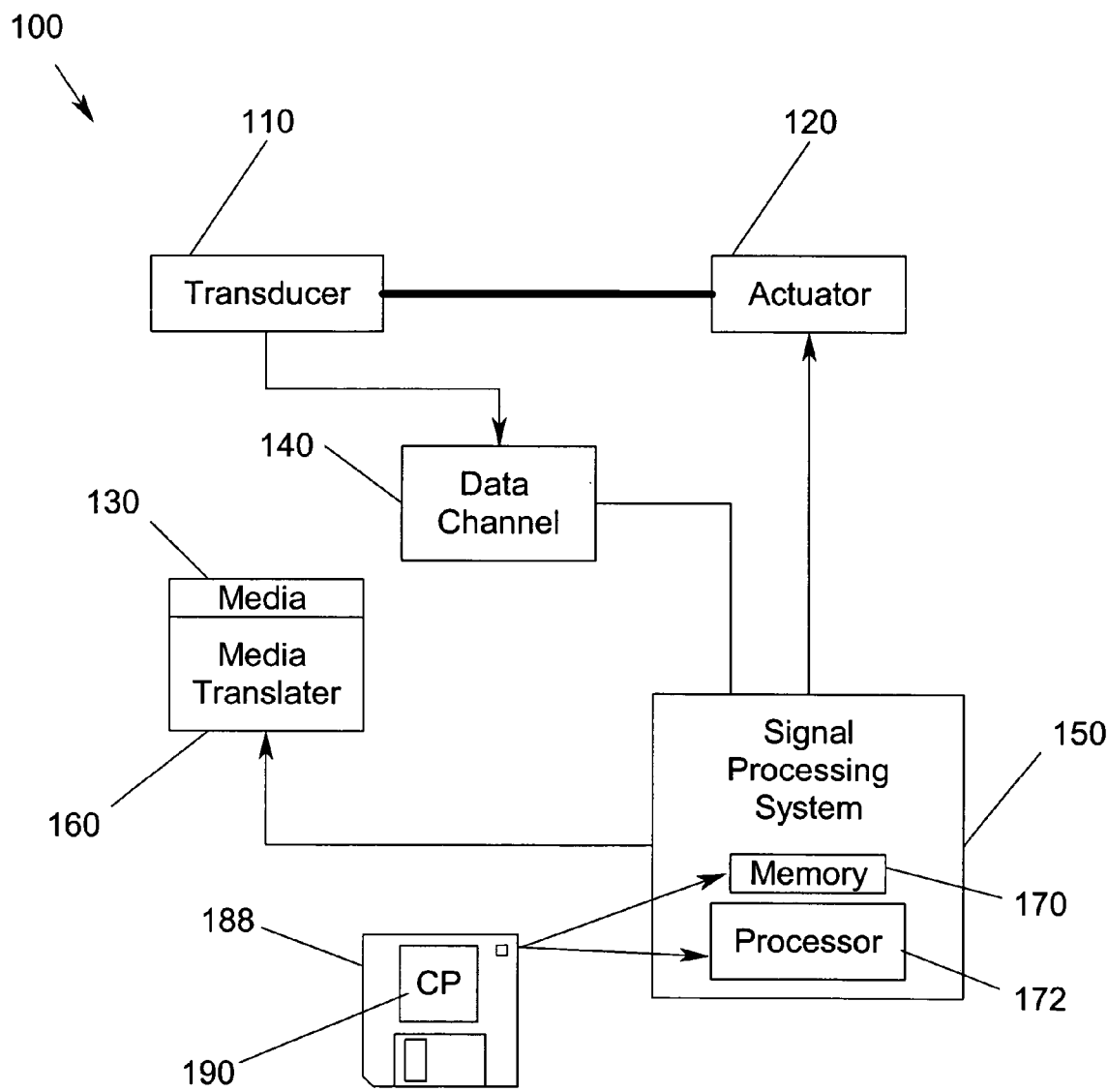
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on a magnetic recording media 130, wherein the recording media 130 is translatable so that its recordable surface may move. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
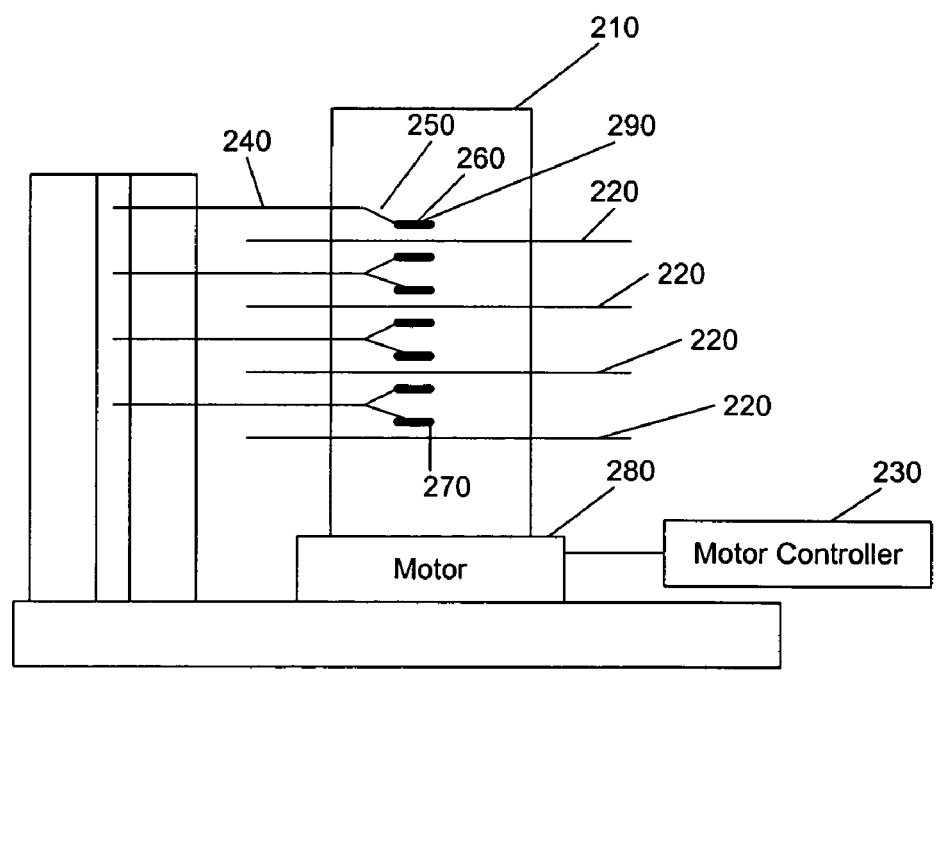
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
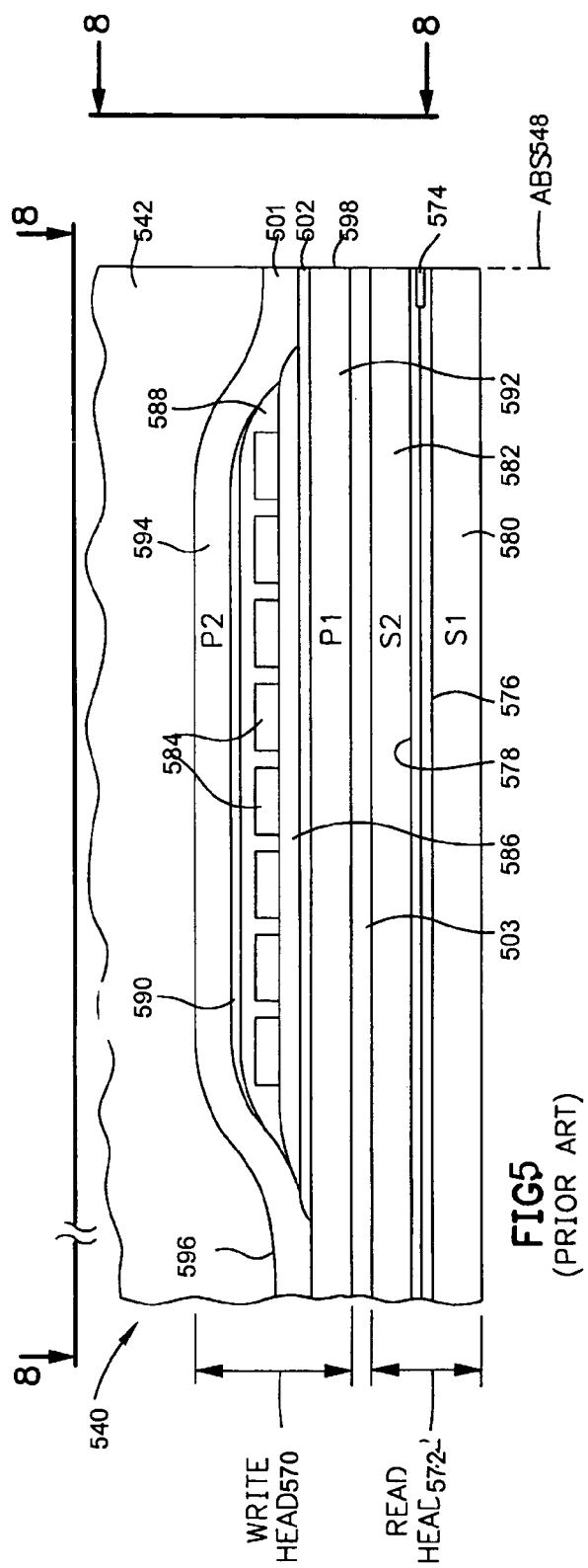
FIG. 5 is a side cross-sectional elevation view of a magnetic head.

FIG. 5 is a side cross-sectional elevation view of a magnetic head 540. The magnetic head 540 includes a write head portion 570 and a read head portion 572. The read head portion 572 includes a sensor 574.

Figure 6:
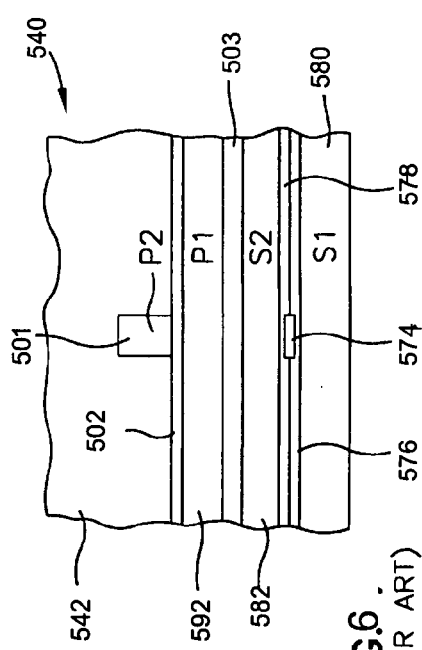
FIG. 6 is an air bearing surface (ABS) view of the magnetic head of FIG. 5.

FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 7:
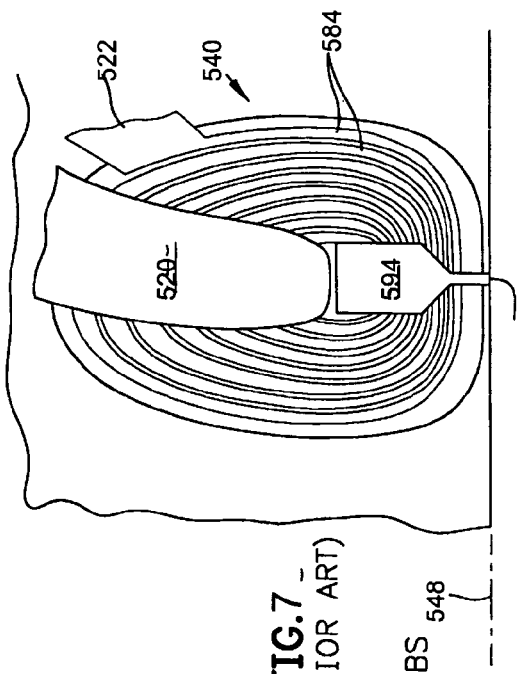
FIG. 7 illustrates the connect leads coupled to the coil for the write pole piece.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
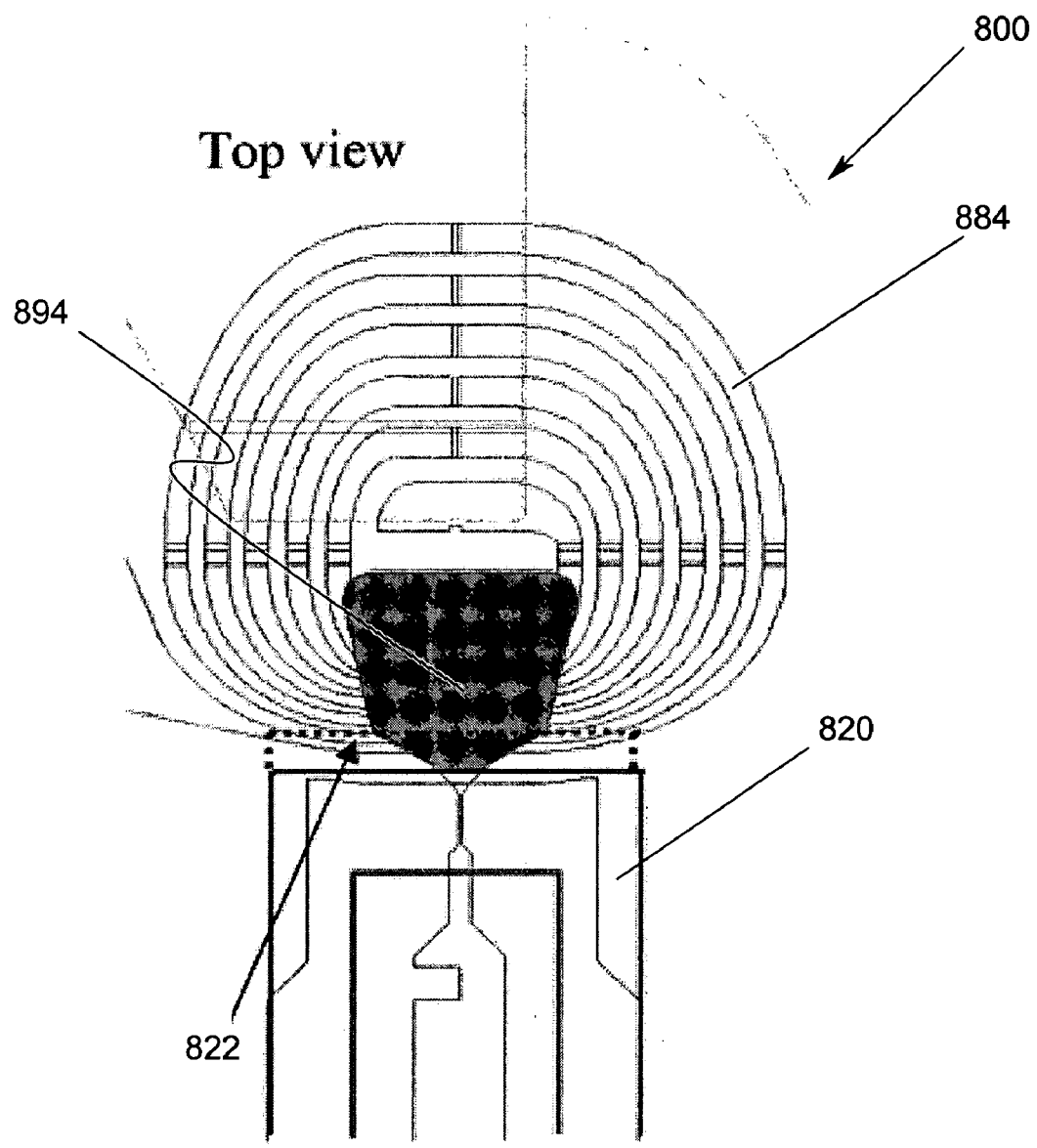
FIG. 8 illustrates a top view of a write head.

FIG. 8 illustrates a top view of a write head 800. In FIG. 8, the write head portion of a magnetic head includes a coil layer 884. The coil layer 884 is disposed under first pole piece layers 894. Ion milling is used to trim and shape the magnetic pole 894 in the magnetic write head 800. However, previous layers of the write head 800, such as the coil layer 884, can be damaged during this ion milling. To protect the coil 884, a photoresist protection layer 820 is patterned previous to the ion milling steps. However, a photoresist mask 820 is eroded during the milling, and the area that is protected changes during the ion mill. As can be seen in FIG. 8, the initial edge 822 of the photoresist 820 pulls back during milling and the coil 884 is exposed. To protect structures of the write head 800 during ion milling, especially the copper write coil 884 which can be damaged during the ion milling, an ion-mill resistant mask is used as described next.

Figure 9:
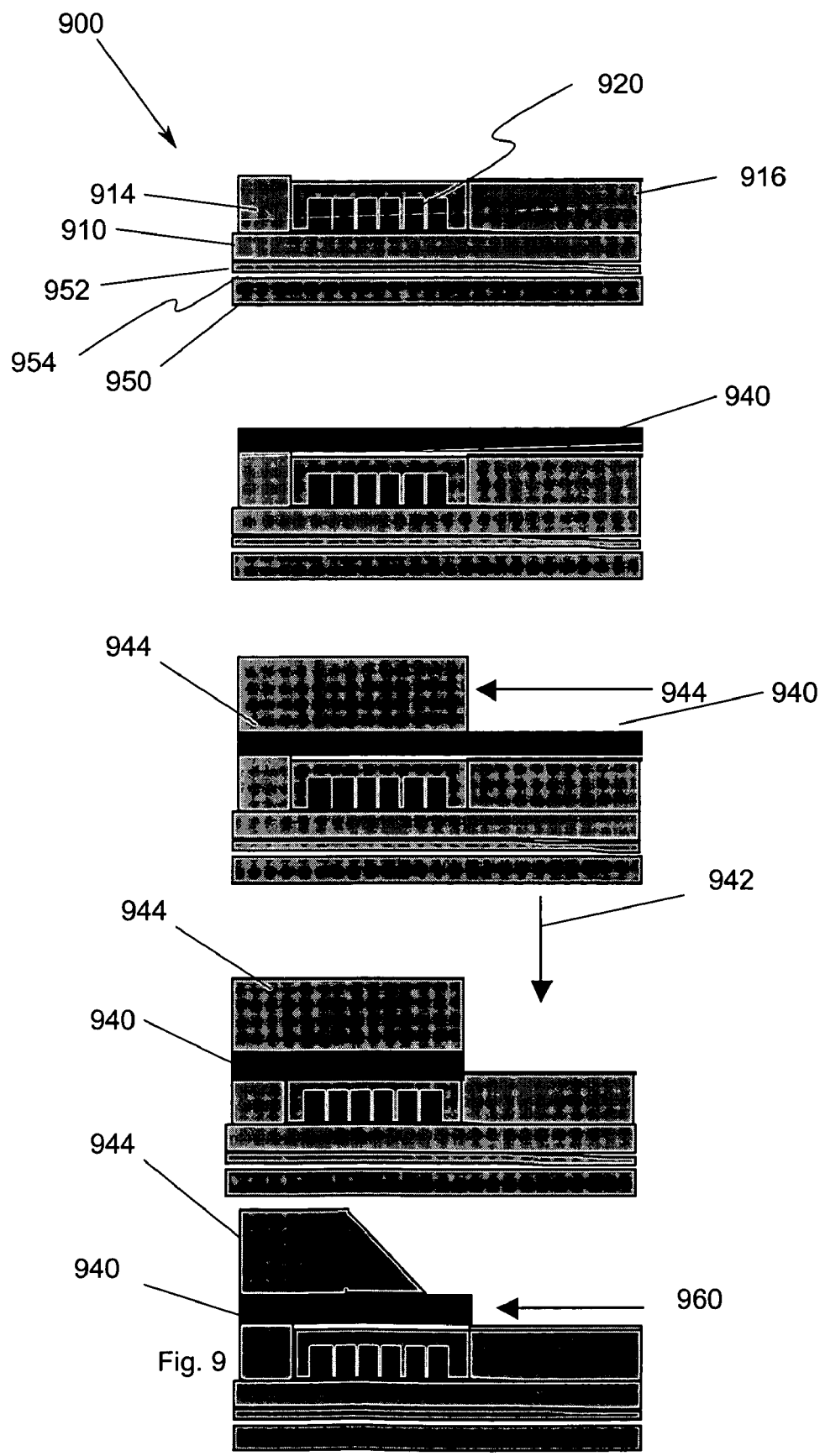
FIG. 9 illustrates the method for protecting write head coil during write pole notching using ion mill resistant mask formed by reactive ion etching according to an embodiment of the present invention.

FIG. 9 illustrates the method 900 for protecting write head coil during write pole notching using ion mill resistant mask formed by reactive ion etching according to an embodiment of the present invention. The ion-mill resistant mask is patterned by reactive ion etching (RIE). In FIG. 9, two shield 950, 952 are shown surrounding a read sensor 954. The write head includes a first pole 910, trailing shield 914, backgap 916 and coils 920. After the pole formation, a seed layer (not shown) is removed as usual by ion milling. After the see layer removal, but before pole notching and trimming, a layer of ion mill-resistant etchable material 940 is deposited on the wafer. A photoresist mask 944 is deposited and the shape of the photoresist mask 944 is patterned using photolithography. Then the pattern is transferred into the ion mill-resistant etchable material 940 using reactive ion etching (RIE) 942. Then the ion milling is performed to trim and shape the magnetic pole in the magnetic write head. During the ion milling, the edge of the ion-mill resistant mask 940 moves less than photoresist 944.

Because the ion mill-resistant etchable material 940 is now made of material that resists the milling better than photoresist 944, the ion mill-resistant etchable material 940 keeps it shape and protects the coil 920 during the milling process. After the milling, the resist 944 is stripped, and the rest of the milling mask 940 is removed by RIE, if needed. In one embodiment of the present invention, the ion mill-resistant mask 940 may comprises an ion mill resistant dielectric, such as carbon. In another embodiment of the present invention, the ion mill-resistant mask 940 is formed using a resistant polyimide that is spin coated onto the wafer before the lithography step. Oxygen or carbon dioxide RIE 942 may then be used to pattern the polyimide mask 940. In the case of a polyimide mask 940, the polyimide mask 940 may be removed in the same step as the removal of the photoresist 944. Other materials may be removed prior to the final trim step. The final trim step may also be used to remove any RIE residues from the surface of the pole.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for protecting write head coil during write pole notching, comprising:
   plating a magnetic pole;
   depositing an ion mill-resistant etchable material for providing an ion mill-resistant mask to protect a coil structure of a write head;
   depositing a photoresist mask on the ion mill-resistant mask;
   patterning the photoresist mask using photolithography;
   transferring the pattern of the photoresist mask into the ion mill-resistant mask using reactive ion etching; and
   performing ion milling to trim and shape the magnetic pole while the ion mill-resistant mask prevents ion milling of the coil structure.

2. The method of claim 1, wherein the ion milling removes a seed layer deposited for plating the magnetic pole.

3. The method of claim 1, wherein further comprising stripping the photoresist after the ion milling is completed.

4. The method of claim 1, further comprising removing the ion mill-resistant material using reactive ion etching.

5. The method of claim 1, wherein the depositing the ion mill-resistant etchable material further comprises depositing an ion mill resistant dielectric layer.

6. The method of claim 5, wherein the depositing an ion mill resistant dielectric layer further comprises depositing a carbon layer.

7. The method of claim 1, wherein the depositing the ion mill-resistant etchable material further comprises depositing a resistant polyimide layer.

8. The method of claim 7, wherein the depositing a resistant polyimide layer further comprises spin coating the resistant polyimide layer.

9. The method of claim 1, wherein the patterning a photoresist mask comprises performing photolithography to pattern the photoresist.

10. The method of claim 1, wherein the performing ion milling to trim and shape the magnetic pole comprises moving the edge of the ion-mill resistant material less than photoresist.

11. The method of claim 1, wherein the performing ion milling to trim and shape the magnetic pole further comprises protecting the coil with the ion mill-resistant material during the milling process.

12. The method of claim 1 further comprising stripping the photoresist after performing the ion milling.

13. The method of claim 12 further comprising removing the ion mill-resistant material using reactive ion etching.

14. The method of claim 13 further comprising removing the ion mill-resistant material in the same step as the removal of the photoresist.

15. The method of claim 1, wherein the depositing the ion mill-resistant etchable material further comprises depositing a resistant polyimide layer.

16. The method of claim 15 further comprising stripping the photoresist after performing the ion milling.

17. The method of claim 16 further comprising removing the ion mill-resistant material using reactive ion etching.

18. The method of claim 17 further comprising removing the polyimide mask in the same step as the removal of the photoresist.

19. The method of claim 1 further comprising removing the ion mill-resistant material using reactive ion etching.

20. The method of claim 1 further comprising removing any surplus material prior to performing ion milling to trim and shape the magnetic pole.

21. The method of claim 1, wherein the performing ion milling to trim and shape the magnetic pole further comprises removing reactive ion etching residues from the surface of the pole.

* * * * *

UNITED STATES PATENT AND TRADEMARK OFFICE
CERTIFICATE OF CORRECTION

PATENT NO. : 7,243,411 B2 Page 1 of 1
APPLICATION NO. : 11/037405
DATED : July 17, 2007
INVENTOR(S) : Druist et al.

It is certified that error appears in the above-identified patent and that said Letters Patent is hereby corrected as shown below:

Title Page, Item (54) and Col. 1, line 2, Title "Pole/Shaping" should read -- Pole Shaping --

Signed and Sealed this

Eighteenth Day of September, 2007

JON W. DUDAS
*Director of the United States Patent and Trademark Office*